(12) United States Patent
Greene et al.

(10) Patent No.: US 6,887,570 B2
(45) Date of Patent: May 3, 2005

(54) COATED CLUMPING LITTER

(75) Inventors: Phillip Brent Greene, Jackson, MO (US); James Dean Job, Kelso, MO (US); James Max Kearbey, St. Louis, MO (US); César J. Mauras, St. Louis, MO (US)

(73) Assignee: Nestec Ltd., Vevey (CH)

( * ) Notice: Subject to any disclaimer, the term of this patent is extended or adjusted under 35 U.S.C. 154(b) by 0 days.

(21) Appl. No.: 10/068,058

(22) Filed: Feb. 5, 2002

(65) Prior Publication Data

US 2003/0148100 A1 Aug. 7, 2003

(51) Int. Cl.⁷ ............................................... B32B 5/16
(52) U.S. Cl. ...................... 428/403; 119/17.1; 119/173; 428/404
(58) Field of Search ................... 428/403, 404; 119/171, 173

(56) References Cited

U.S. PATENT DOCUMENTS

| | | |
|---|---|---|
| 2,531,427 A | 11/1950 | Hauser |
| 3,586,478 A | 6/1971 | Neumann |
| 3,789,797 A | 2/1974 | Brewer |
| 4,036,928 A | 7/1977 | Valenta |
| 4,085,704 A | 4/1978 | Frazier |
| 4,157,696 A * | 6/1979 | Carlberg ..................... 119/172 |
| 4,163,674 A | 8/1979 | Been |
| 4,187,803 A | 2/1980 | Valenta |
| 4,278,047 A | 7/1981 | Luca |
| 4,407,231 A | 10/1983 | Colborn et al. |
| 4,459,368 A | 7/1984 | Jaffee et al. |
| 4,622,920 A | 11/1986 | Goss |
| 4,641,605 A | 2/1987 | Gordon |
| 4,689,297 A | 8/1987 | Good et al. |
| 4,976,977 A | 12/1990 | Johnson et al. |
| 5,094,189 A | 3/1992 | Aylen et al. |

(Continued)

OTHER PUBLICATIONS

PCT International Search Report (5 pgs.); International Application of: Nestec, Ltd, et al.; International Application No.; PCT/US03/03274; Filing Date: Feb. 4, 2003; Title: Coated Clumping Litter.

Primary Examiner—H. Thi Le
(74) Attorney, Agent, or Firm—Bell, Boyd & Lloyd LLC

(57) ABSTRACT

A clumping animal litter is disclosed which includes non-swelling particles and a swelling agent coated on the non-swelling particles. In one embodiment, the non-swelling particles are manufactured by agglomerating clay fines.

49 Claims, 3 Drawing Sheets

U.S. PATENT DOCUMENTS

| | | |
|---|---|---|
| 5,101,771 A | 4/1992 | Goss |
| RE33,983 E | 7/1992 | Hughes |
| 5,129,365 A | 7/1992 | Hughes |
| 5,146,877 A | 9/1992 | Jaffee et al. |
| 5,176,107 A | 1/1993 | Buschur |
| 5,188,064 A | 2/1993 | House |
| 5,193,489 A | 3/1993 | Hardin |
| 5,196,473 A | 3/1993 | Valenta et al. |
| 5,303,676 A | 4/1994 | Lawson |
| 5,317,990 A | 6/1994 | Hughes |
| 5,339,769 A | 8/1994 | Toth et al. |
| 5,359,961 A | 11/1994 | Goss et al. |
| 5,386,803 A | 2/1995 | Hughes |
| 5,421,291 A | 6/1995 | Lawson et al. |
| 5,452,684 A | 9/1995 | Elazier-Davis et al. |
| 5,469,809 A | 11/1995 | Coleman |
| 5,503,111 A | 4/1996 | Hughes |
| 5,542,374 A | 8/1996 | Palmer, Jr. |
| 5,577,463 A | 11/1996 | Elazier-Davis et al. |
| 5,664,523 A | 9/1997 | Ochi et al. |
| 5,735,232 A | 4/1998 | Lang et al. |
| 5,762,023 A | 6/1998 | Carter |
| 5,806,462 A | 9/1998 | Parr |
| 5,824,226 A | 10/1998 | Boyd et al. |
| 5,836,263 A | 11/1998 | Goss et al. |
| 5,901,661 A | 5/1999 | Pattengill et al. |
| 5,960,743 A | 10/1999 | Taylor |
| 5,975,019 A | 11/1999 | Goss et al. |
| 5,992,351 A | 11/1999 | Jenkins |
| 6,020,282 A | 2/2000 | Taylor et al. |
| 6,039,004 A | 3/2000 | Goss et al. |
| 6,089,189 A | 7/2000 | Goss et al. |
| 6,089,190 A | 7/2000 | Jaffee et al. |
| 6,210,625 B1 | 4/2001 | Matsushita et al. |

\* cited by examiner

| Sample | 15 min saline | | 15 min urine | | 1 hr urine | | 24 hr urine | |
|---|---|---|---|---|---|---|---|---|
| | Cl. Wt. | Cl. Str. | Cl. Wt. | Cl. Str. | Cl. Wt. | Cl. Str. | Cl. Wt. | Cl. Str. |
| A Control- Blm 75/25 scoop blend | 27.66 | 0.94 | 26.82 | 0.91 | 26.15 | 1.10 | 20.74 | 1.51 |
| | 27.72 | 0.93 | 26.85 | 0.92 | 26.29 | 1.04 | 20.79 | 1.66 |
| | 27.53 | 0.96 | 26.97 | 0.95 | 26.37 | 1.04 | 20.11 | 1.97 |
| avg. | 27.64 | 0.94 | 26.88 | 0.93 | 26.27 | 1.06 | 20.55 | 1.71 |
| B CMS prototype #2 | 32.95 | 1.17 | 32.04 | 0.93 | 32.27 | 1.23 | 28.52 | 7.13 |
| | 32.97 | 1.26 | 31.54 | 1.16 | 31.23 | 0.95 | 27.38 | 7.80 |
| | 32.92 | 1.10 | 32.18 | 1.11 | 32.00 | 1.21 | 27.22 | 6.02 |
| avg. | 32.95 | 1.18 | 31.92 | 1.07 | 31.83 | 1.13 | 27.71 | 6.98 |
| C CMS prototype #3 | 32.61 | 1.12 | 33.17 | 1.31 | 31.44 | 1.44 | 27.59 | 6.80 |
| | 32.74 | 1.42 | 33.65 | 1.29 | 28.99 | 1.09 | 27.08 | 5.81 |
| | 32.43 | 1.16 | 33.94 | 1.35 | 32.10 | 1.26 | 26.94 | 3.74 |
| avg. | 32.59 | 1.23 | 33.59 | 1.32 | 30.84 | 1.26 | 27.20 | 5.45 |
| D CMS prototype #4 | 32.20 | 1.38 | 32.43 | 1.06 | 30.78 | 1.09 | 26.78 | 3.29 |
| | 31.86 | 1.25 | 33.16 | 1.59 | 31.84 | 1.66 | 26.98 | 3.03 |
| | 31.53 | 1.37 | 32.07 | 1.68 | 32.42 | 1.22 | 27.50 | 4.88 |
| avg. | 31.86 | 1.33 | 32.55 | 1.44 | 31.68 | 1.32 | 27.08 | 3.73 |
| E CMS prototype #7 | 33.36 | 1.14 | 35.09 | 1.41 | 35.24 | 1.25 | 31.23 | 5.59 |
| | 34.37 | 1.23 | 34.61 | 1.26 | 35.43 | 1.69 | 29.45 | 3.66 |
| | 34.33 | 1.25 | 34.69 | 1.52 | 34.38 | 0.97 | 27.94 | 3.46 |
| avg. | 34.02 | 1.21 | 34.80 | 1.40 | 35.02 | 1.30 | 29.54 | 4.24 |
| F CMS prototype #8 | 34.62 | 1.52 | 34.76 | 1.25 | 32.97 | 0.97 | 29.78 | 4.93 |
| | 34.17 | 1.23 | 35.34 | 1.45 | 34.17 | 1.02 | 29.64 | 4.48 |
| | 34.47 | 1.21 | 35.41 | 0.94 | 33.79 | 1.58 | 27.76 | 3.69 |
| avg. | 34.42 | 1.32 | 35.17 | 1.21 | 33.64 | 1.19 | 29.06 | 4.37 |

Note: Standardized male urine (sp. Gr. 1.050) was used for all urine clump strength testing. 2% Saline solution was used for all saline clump testing.

CMS Prototype Samples B through F are 70.0% Seed Base produced from by-product dust, and 30.0% 200 mesh Bentonite coating powder.

FIG. 2

| A | | | B | | | C | | |
|---|---|---|---|---|---|---|---|---|
| Screen Analysis | | | Screen Analysis | | | Screen Analysis | | |
| mesh | grams | % | mesh | grams | % | mesh | grams | % |
| 8 | 0 | 0 | 8 | 76.5 | 20.1 | 8 | 52.1 | 13.1 |
| 12 | 0.8 | 0.2 | 12 | 195.4 | 51.3 | 12 | 197.7 | 49.8 |
| 14 | 3.8 | 0.9 | 14 | 83.2 | 21.9 | 14 | 105.6 | 26.6 |
| 20 | 141 | 35.1 | 20 | 18.2 | 4.8 | 20 | 16.6 | 4.2 |
| 40 | 214.6 | 53.5 | 40 | 0.7 | 0.2 | 40 | 0.4 | 0.1 |
| 50 | 33.4 | 8.3 | 50 | 0 | 0 | 50 | 0 | 0 |
| pan | 7.8 | 1.9 | pan | 6.6 | 1.7 | pan | 24.9 | 6.3 |
| Fin.Wt. | 401.4 | | Fin.Wt. | 380.6 | | Fin.Wt. | 397.3 | |

| D | | | E | | | F | | |
|---|---|---|---|---|---|---|---|---|
| Screen Analysis | | | Screen Analysis | | | Screen Analysis | | |
| mesh | grams | % | mesh | grams | % | mesh | grams | % |
| 8 | 66.5 | 16.2 | 8 | 25.2 | 6.6 | 8 | 48.5 | 12.6 |
| 12 | 220.9 | 53.7 | 12 | 174.3 | 45.5 | 12 | 195.3 | 50.8 |
| 14 | 83.1 | 20.2 | 14 | 108.3 | 28.3 | 14 | 87.2 | 22.7 |
| 20 | 17.8 | 4.3 | 20 | 53.6 | 14 | 20 | 36.9 | 9.6 |
| 40 | 0.4 | 0.1 | 40 | 5 | 1.3 | 40 | 3.4 | 0.9 |
| 50 | 0 | 0 | 50 | 1.1 | 0.3 | 50 | 0.1 | 0 |
| pan | 22.7 | 5.5 | pan | 15.8 | 4.1 | pan | 13.3 | 3.5 |
| Fin.Wt. | 411.4 | | Fin.Wt. | 383.3 | | Fin.Wt. | 384.7 | |

| Sample | Bulk Density (lbs./cu. Ft.) | Moisture (percent) |
|---|---|---|
| A | 55.8 | 6.21 |
| B | 46.6 | 9.75 |
| C | 47.5 | 6.65 |
| D | 45.9 | 5.65 |
| E | 49.2 | 7.96 |
| F | 48.9 | 8.62 |

FIG. 3

COATED CLUMPING LITTER

BACKGROUND OF THE INVENTION

This invention relates generally to absorbent materials, and more specifically to, various litter compositions used for the control and removal of animal waste.

Known litter compositions are fabricated primarily from one of four materials: clay; vegetable matter such as grass, hay or alfalfa; wood chips, shavings or sawdust; and paper, such as shredded, flaked or pelletized paper. Known clay litters are prone to produce dust, and tracking out by the animal. Further, production of such clay litters results in a large quantity of dust being produced, sometimes referred to as clay fines. Clay fines present a problem to the litter manufacturers since the fines are a waste product and require disposal. In addition such clay products are not biodegradable.

Sodium bentonite clay is one known material used in the production of litters and is known for its excellent absorption and clumping qualities, as well as for odor retention. However, sodium bentonite is relatively expensive compared to other litter components. Therefore, attempts have been made to reduce the amount of sodium bentonite in clumping litters, for example, mixing pellets of non-absorbing clays with pellets of sodium bentonite clay in varying ratios. However, in these known litters, the properties which are most desirable in the sodium bentonite have been underutilized as most of the clumping and binding qualities of sodium bentonite occur at or near the surface of the clay.

BRIEF DESCRIPTION OF THE INVENTION

In one aspect, an animal litter is disclosed which comprises non-swelling particles and a swelling agent coated on the non-swelling particles.

In another aspect, an absorbent material is disclosed which comprises clay particles in a size range of −10 to +50 mesh and a coating for the particles which comprises a bentonite powder.

In still another aspect, a clumping animal litter is disclosed which comprises clay particles in a size range of about −10 to +50 mesh which are agglomerated from clay fines of about −50 mesh size. A coating surrounds the particles.

In a further aspect, a method for manufacturing a clumping animal litter is disclosed which comprises agglomerating clay fines into particles and coating the particles with a powder.

In yet another aspect, a clumping animal litter is disclosed which comprises clay particles in a size range of about −10 to +50 mesh in size and bentonite powder of about 200 mesh size. The powder is applied as a coating to the particles in an amount of about 20% to about 40% by weight.

BRIEF DESCRIPTION OF THE DRAWINGS

FIG. 2 is a clumping analysis of several samples of coated clumping litter.

FIG. 3 shows a screen analysis, a bulk density, and a moisture content for each sample analyzed in FIG. 2.

DETAILED DESCRIPTION OF THE INVENTION

Figure 1:
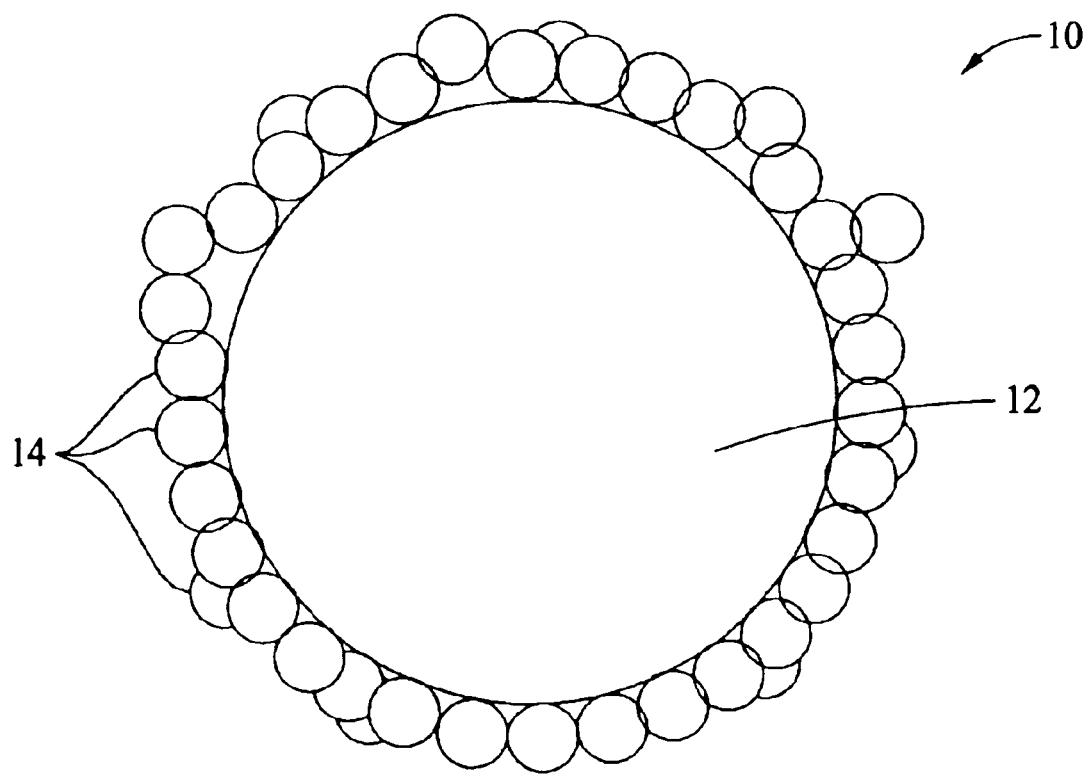
FIG. 1 is a cross sectional view of a particle of coated clumping litter.

Referring to FIG. 1, absorbent particles 10 include clay fines agglomerated into clay particles 12, which are coated with a powder 14. In one embodiment, absorbent particles 10 are utilized in an animal litter. In alternative embodiments, the animal litter includes cat, dog, hamster and livestock litter. The clay fines used in the agglomeration process are about −50 mesh in size and are sometimes referred to as a clay seed base or a seed material. In an exemplary embodiment, clay particles 12 range in size from about −10 mesh to about +50 mesh, based on standard U.S. mesh.

In an exemplary embodiment, the clay fines are agglomerated using a pin mixer. A powder 14 is applied to particles 12 to form a coating. Powder 14 is the active ingredient of the litter. Exemplary coating powders include at least one of a sodium bentonite powder and a bentonite/guar gum blended powder. However, the powder coatings may be augmented with either or both of an odor control agent and an anti-microbial agent. Particle 10 is spherical in shape, the shape shown is by way of example only as it is contemplated that a host of shapes and sizes of coated particles can be produced by the embodiments and processes described herein.

One specific embodiment includes recovery of waste fines which include Calcium-Montmorillonite. The Calcium-Montmorillonite fines are agglomerated in a pin mixer using water as a binder. The agglomerated fines have a moisture content of about 20% to about 40%. In another embodiment, the fines have a moisture content of about 28% to about 34%. The agglomerated fines are then coated with a bentonite powder of about 200 mesh using a centrifugal coater or a rotary coater/dryer system.

In one embodiment, the clay fines are fed into a pin mixer using a screw extruder. Moisture (water) is added to the fines to act as a binder, in one embodiment about 28%, while in the extruder. The fines and the moisture result in a cake like substance as it enters the pin mixer. A pin mixer includes a shaft with a series of pins which breaks up the cake and results in the formation of small, spherically shaped particles which are separated from the cake-like batch using shaker screens. As previously described, in one embodiment, the clay fines are about −50 mesh in size and after addition of the moisture and the pin mixing process, resulting in particles 12 of between about −10 mesh and +50 mesh in size. Other methods are contemplated which include using binders of guar gum and water or starch and water.

Another embodiment utilizes a blend of clay fines and bentonite fines with water as a binder to produce particles 12 through the pin mixing process. Still another embodiment utilizes sodium bentonite fines with water as a binder to produce particles 12 of between about −10 mesh and +50 mesh in size through the pin mixing process. The agglomerated fines, including the clay and bentonite embodiment, or the bentonite embodiment, are then coated with a bentonite powder of about 200 mesh using a centrifugal coater or a rotary coater/dryer system for improved clumping capability.

In alternative embodiments, methods for coating an outer surface of clay particles 12 with powder 14 include utilization of at least one of a fluidized bed dryer, a semi-continuous centrifugal coater or a rotary coating and drying system. In the rotary system, clay particles 12 and powder 14 are tumbled in a drum to mix for about 60 seconds. The litter is then removed from the drum and the drum is heated to about 300° to about 400° Farenheit and the litter is returned to the drum and dried until about an 8% moisture content is obtained.

The resulting coated litter is typically in the −10 to +50 mesh size range, with a moisture content from about 15% to about 5%, preferably with a moisture content of about 8%. In one embodiment, the bentonite coating is about 20% to about 40% by weight of a coated particle. In an alternative embodiment, the bentonite coating is about 25% to about 35% by weight of a coated particle. In a further alternative embodiment, the bentonite coating is about 30% by weight of a coated particle.

In alternative method for producing the litter, the agglomerated fines are placed in a fluidized bed and bentonite coating is sprayed in a low concentration solution.

FIGS. 2 and 3 are an analysis of several samples of coated clumping litter which includes 70% by weight particles produced from fines as described above and 30% by weight 200 mesh bentonite coating. FIG. 2 illustrates clumping weight and clumping strength for several representative samples and is charted based upon wetting, for example, 15 minutes after wetting with a saline solution, and for 15 minutes, one hour, and 24 hours after being wetted with a standard urine sample. FIG. 3 shows a screen analysis, a bulk density, and a moisture content for each sample analyzed in FIG. 2. The screen analysis indicates a weight and a percentage for each sample that passed through standard mesh screens, for example, 8, 12, 14, 20, 40, and 50 mesh screens.

The litter resulting from the compositions and methods described above has superior clumping properties as the active clumping agent is kept on the surface of the particles, where the clumping bonds are formed. In addition, the litter has a dust content which is lower than known clumping litters, resulting in less tracking, as the coating processes described above result in a shell being formed around the agglomerated particles. Further, the litter is easier to remove from litter boxes than known clumping litters as the litter described herein is less likely to attach to litter boxes.

In the above described embodiments, coating with bentonite provides a litter which includes the clumping and absorption qualities of a litter which is composed solely of sodium bentonite. However, due to the coating process, the amount by weight of sodium bentonite is reduced over known clumping litters, resulting in more efficient use of the sodium bentonite while providing a production cost savings over those litters with higher percentage amounts of sodium bentonite. In addition, the coated litter produced provides a lighter weight product and has a unique, homogeneous appearance that appeals to consumers. Further, the agglomeration process results in a utilization of clay product fines, which heretofore have been considered waste products, and since clay is not biodegradable, clay fines have traditionally required space for disposal.

While the invention has been described in terms of various specific embodiments, those skilled in the art will recognize that the invention can be practiced with modification within the spirit and scope of the claims.

What is claimed is:

1. An animal litter comprising:
   non-swelling particles; and
   bentonite particles coated on said non-swelling particles.
2. An animal litter according to claim 1 wherein said non-swelling particles are clay particles.
3. An animal litter according to claim 2 wherein said clay particles comprise agglomerated clay fines.
4. An animal litter according to claim 3 wherein said clay fines have a size of about 50 mesh.
5. An animal litter according to claim 1 wherein said bentonite particles are a powder.
6. An animal litter according to claim 1 wherein said bentonite particles have a size range of about 100 mesh to about 300 mesh.
7. An animal litter according to claim 6 wherein said bentonite particles have a size of about 200 mesh.
8. An animal litter according to claim 1 wherein said non-swelling particles have a size range of about −10 to about +50 mesh.
9. An animal litter according to claim 1 wherein said bentonite particles are about 20% to about 40% by weight of said animal litter.
10. An animal litter according to claim 9 wherein said bentonite particles are about 25% to about 35% by weight of said animal litter.
11. An animal litter according to claim 10 wherein said bentonite particles are about 28% by weight of said animal litter.
12. An absorbent material comprising:
    clay particles in the range of −10 to +50 mesh; and
    a coating for said particles, said coating comprising a bentonite powder.
13. An absorbent material according to claim 12 wherein said particles are agglomerated from clay fines of about −50 mesh in size.
14. An absorbent material according to claim 12 wherein said powder comprises powder particles of about 200 mesh in size.
15. An absorbent material according to claim 12 wherein said powder comprises powder particles in an amount of about 20% to about 40% by weight of said absorbent material.
16. A clumping animal litter comprising:
    clay particles in the range of −10 to +50 mesh, said particles being agglomerated from clay fines of about −50 mesh in size; and
    a coating for said particles, said coating comprising bentonite.
17. A clumping animal litter according to claim 16 wherein said coating comprises a bentonite powder.
18. A clumping animal litter according to claim 17 wherein said coating comprises bentonite particles with a size of about 200 mesh.
19. A clumping animal litter according to claim 16 wherein said coating comprises a bentonite powder and guar gum powder blend.
20. A clumping animal litter according to claim 16 wherein said coating comprises an odor control agent.
21. A clumping animal litter according to claim 16 wherein said coating comprises an anti-microbial agent.
22. A clumping animal litter according to claim 16 wherein said clay particles comprise Calcium-Montmoriulonite fines.
23. A clumping animal litter according to claim 16 wherein said clay particles have a moisture content from about 20% to about 40% before being coated.
24. A clumping animal litter according to claim 16 wherein said clay particles have a moisture content from about 28% to about 34% before being coated.
25. A clumping animal litter according to claim 16 wherein said litter has a moisture content from about 5% to about 15%.
26. A clumping animal litter according to claim 25 wherein said litter has a moisture content of about 8%.
27. A clumping animal litter according to claim 16 wherein said coating is from about 20% to about 40% by weight of said litter.
28. A clumping animal litter according to claim 27 wherein said coating is from about 25% to about 35% by weight of said litter.
29. A clumping animal litter according to claim 28 wherein said coating is about 30% by weight of said litter.

30. A clumping animal litter according to claim 16 wherein the clay fines are agglomerated in a pin mixer.

31. A method for manufacturing a clumping animal litter comprising:

agglomerating clay fines into particles; and coating the particles with a bentonite powder.

32. A method according to claim 31 wherein agglomerating clay fines comprises agglomerating clay fines using a pin mixer.

33. A method according to claim 31 wherein agglomerating clay fines comprises agglomerating a blend of clay fines and bentonite fines using a pin mixer.

34. A method according to claim 31 wherein agglomerating clay fines comprises agglomerating bentonite fines using a pin mixer.

35. A method according to claim 31 wherein coating the particles comprises coating the particles with a bentonite powder and guar gum powder blend.

36. A method according to claim 31 wherein coating the particles comprises coating the particles with a powder blended with a fragrance.

37. A method according to claim 31 wherein coating the particles comprises coating the particles using at least one of a fluidized bed dryer, a semi-continuous centrifugal coater, and a rotary coating and drying system.

38. A method according to claim 31 further comprising drying the coated particles.

39. A method according to claim 38 wherein drying the coated particles comprises drying the particles to a moisture content from about 5% to about 15%.

40. A method according to claim 31 wherein coating the particles comprises applying a powder in an amount of about 20% to about 40% by weight of a coated particle.

41. A method according to claim 40 coating the particles comprises applying a powder in an amount of about 25% to about 35% by weight of a coated particle.

42. A method according to claim 41 wherein coating the particles comprises applying a powder in an amount of about 28% by weight of a coated particle.

43. A clumping animal litter comprising:

clay particles in the range of −10 to +50 mesh in size; and bentonite powder of about 200 mesh, said powder applied as a coating to said particles in an amount of about 20% to about 40% by weight.

44. A clumping animal litter according to claim 43 wherein said clay particles are agglomerated from clay fines of about −50 mesh in size.

45. A clumping animal litter according to claim 43 wherein said bentonite powder is sprayed on said clay particles placed in a fluidized bed.

46. A clumping animal litter according to claim 43 wherein said litter has a moisture content of about 5% to about 15%.

47. A clumping animal litter according to claim 46 wherein said litter has a moisture content of about 8%.

48. A clumping animal litter according to claim 43 wherein said clay particles are agglomerated from a blend of clay fines and bentonite fines of about −50 mesh in size.

49. A clumping animal litter according to claim 43 wherein said clay particles are agglomerated from bentonite fines of about −50 mesh in size.

* * * * *

(12) EX PARTE REEXAMINATION CERTIFICATE (5983rd)

United States Patent
Greene et al.

(10) Number: US 6,887,570 C1
(45) Certificate Issued: Oct. 30, 2007

(54) COATED CLUMPING LITTER

(75) Inventors: Phillip Brent Greene, Jackson, MO (US); James Dean Job, Kelso, MO (US); James Max Kearbey, St. Louis, MO (US); César J. Mauras, St. Louis, MO (US)

(73) Assignee: NPPC Services, Inc., St. Louis, MO (US)

Reexamination Request:
No. 90/007,976, Mar. 20, 2006

Reexamination Certificate for:
Patent No.: 6,887,570
Issued: May 3, 2005
Appl. No.: 10/068,058
Filed: Feb. 5, 2002

(51) Int. Cl.
*A01K 1/015* (2006.01)

(52) U.S. Cl. .................. 428/403; 428/404; 119/171; 119/173

(58) Field of Classification Search .............. None
See application file for complete search history.

(56) References Cited

U.S. PATENT DOCUMENTS

| | | | |
|---|---|---|---|
| 4,657,881 A | 4/1987 | Crampton et al. | |
| 4,704,989 A | 11/1987 | Rosenfeld | |
| 5,062,383 A | * 11/1991 | Nelson | 119/173 |
| 5,452,684 A | 9/1995 | Elazier-Davis et al. | |
| 5,647,300 A | 7/1997 | Tucker | |
| 5,743,213 A | 4/1998 | Fujiura | |
| 5,840,113 A | * 11/1998 | Freeman et al. | 106/487 |
| 5,975,019 A | 11/1999 | Goss et al. | |
| 6,371,050 B1 | 4/2002 | Mochizuki | |
| 6,767,507 B1 | 7/2004 | Woo | |

FOREIGN PATENT DOCUMENTS

| | | |
|---|---|---|
| JP | S62-239932 | 10/1987 |
| JP | 6-14669 | 1/1994 |
| JP | 10-262482 | 10/1998 |

* cited by examiner

*Primary Examiner*—Stephen Stein

(57) ABSTRACT

A clumping animal litter is disclosed which includes non-swelling particles and a swelling agent coated on the non-swelling particles. In one embodiment, the non-swelling particles are manufactured by agglomerating clay fines.

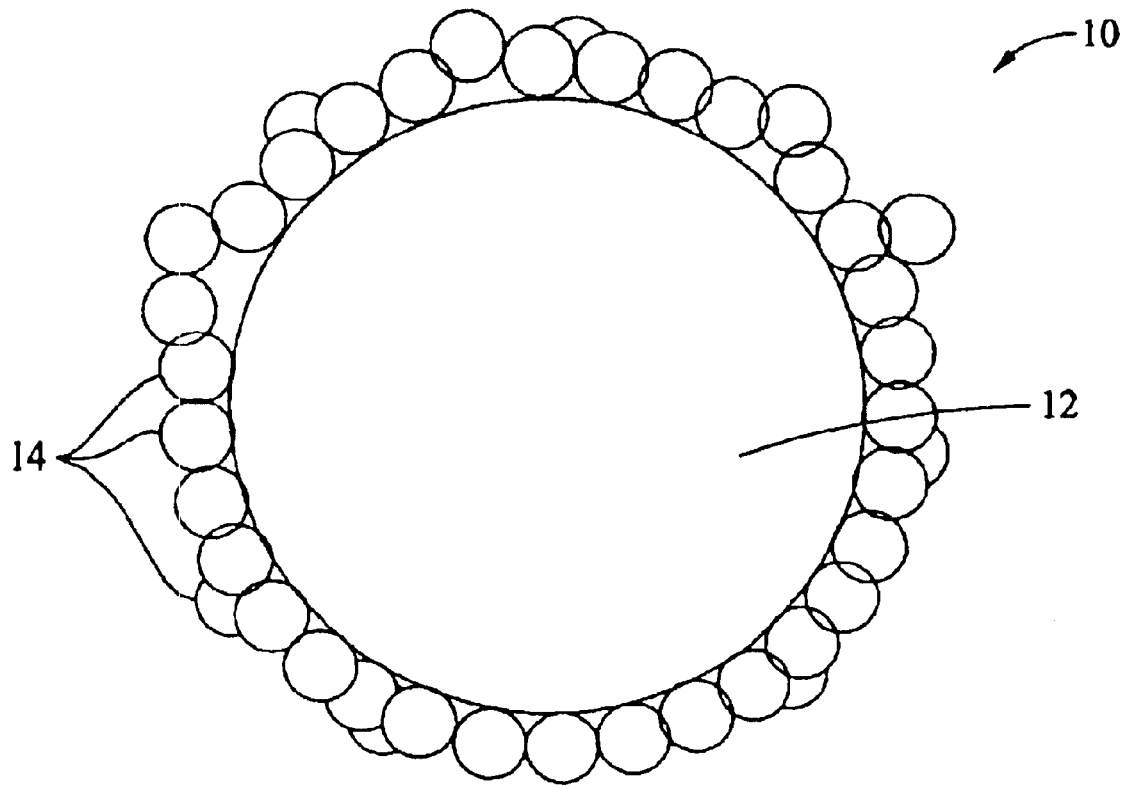

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 16–29, 31 and 35–42 is confirmed.

Claims 1, 2, 12–15, 30 and 34 are cancelled.

Claims 3, 4, 5, 6, 8, 9, 32, 33 and 43–45 are determined to be patentable as amended.

Claims 7, 10, 11 and 46–49, dependent on an amended claim, are determined to be patentable.

New claims 50–54 are added and determined to be patentable.

3. An animal litter [according to claim 2 wherein said] *comprising bentonite particles coated on non-swelling* clay particles [comprise] *comprising* agglomerated clay fines.

4. An animal litter according to claim 3 wherein said clay fines have a size of about [50] *–50* mesh.

5. An animal litter according to claim *3* [1] wherein said bentonite particles are a powder.

6. An animal litter according to claim [1] *3* wherein said bentonite particles have a size range of about 100 mesh to about 300 mesh.

8. An animal litter according to claim [1] *3* wherein said [non-swelling] *clay* particles have a size range of about –10 to about +50 mesh.

9. An animal litter according to claim [1] *3* wherein said bentonite particles are about 20% to about 40% by weight of said animal litter.

32. A method according to claim 31 wherein [agglomerating] *the* clay fines [comprises agglomerating clay fines using] *are agglomerated in* a pin mixer.

33. A method according to claim [31] *32* wherein [agglomerating clay fines comprises agglomerating] a blend of clay fines and bentonite fines [using a pin mixer] *are agglomerated*.

43. A clumping animal litter comprising:

clay particles in the range of –10 to +50 mesh in size *comprising agglomerates of fines*; and a coating on said particles in an amount of about 25% to about 40% by weight bentonite powder of about 200 mesh. [,said powder applied as a coating to said particles in an amount of about 20% to about 40% by weight.]

44. A clumping animal litter according to claim 43 wherein said [clay particles are agglomerated from] *agglomerates comprise* clay fines of about –50 mesh in size.

45. A clumping animal litter according to claim 43 wherein said bentonite powder is [sprayed] *coated* on said clay particles [placed in a fluidized bed] *in an amount of from about 25% to about 35% by weight*.

50. *An animal litter comprising non-swelling particles comprising agglomerates of fines having a size of about –50 mesh and wherein the non-swelling particles are coated with bentonite particles.*

51. *An animal litter according to claim 50 wherein the fines comprise clay.*

52. *An animal litter composition comprising non-swelling particles comprising agglomerated clay fines coated with bentonite particles and having a bulk density of from about 45.9 lbs/Ft³ to about 55.8 lbs/Ft³.*

53. *An animal litter according to claim 52 wherein the bulk density is from about 46.6 lbs/Ft³ to about 49.2 lbs/Ft³.*

54. *An animal litter according to claim 53 wherein the bulk density is from about 47.5 lbs/Ft³ to about 48.9 lbs/Ft³.*

* * * * *